United States Patent
Blewett et al.

(10) Patent No.: US 9,549,074 B2
(45) Date of Patent: *Jan. 17, 2017

(54) METHOD AND APPARATUS FOR PROVIDING AMBIENT SOCIAL TELEPHONY

(71) Applicant: AT&T Intellectual Property I, L.P., Atlanta, GA (US)

(72) Inventors: Charles Douglas Blewett, Madison, NJ (US); Megan Blewett, Cambridge, MA (US); Joseph Gibbons, Lindehurst, NY (US); Robert Haarde, Sudbury, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,309

(22) Filed: May 4, 2015

(65) Prior Publication Data

US 2015/0237214 A1     Aug. 20, 2015

Related U.S. Application Data

(63) Continuation of application No. 13/286,329, filed on Nov. 1, 2011, now Pat. No. 9,025,752.

(51) Int. Cl.
| | |
|---|---|
| *H04M 3/56* | (2006.01) |
| *H04W 4/14* | (2009.01) |
| *H04L 29/06* | (2006.01) |
| *H04L 29/08* | (2006.01) |

(52) U.S. Cl.
CPC .......... *H04M 3/563* (2013.01); *H04L 65/1093* (2013.01); *H04L 67/306* (2013.01); *H04M 3/568* (2013.01); *H04W 4/14* (2013.01)

(58) Field of Classification Search
USPC ........................ 379/67.1, 93.21, 158, 202.01, 205.01,379/373.04; 370/260–262, 271; 455/416
See application file for complete search history.

(56) References Cited

U.S. PATENT DOCUMENTS

| | | | |
|---|---|---|---|
| 6,330,022 | B1 | 12/2001 | Seligmann |
| 7,590,230 | B1 | 9/2009 | Surazski |
| 7,983,201 | B2 * | 7/2011 | Baker et al. ................. 370/261 |
| 8,068,604 | B2 * | 11/2011 | Leeds .................. H04M 1/656 379/373.04 |
| 8,295,462 | B2 | 10/2012 | Miller et al. |
| 9,025,752 | B2 | 5/2015 | Blewett et al. |
| 2007/0274492 | A1 | 11/2007 | Baker et al. |
| 2008/0233933 | A1 * | 9/2008 | Gilbert .................... H04M 3/56 455/416 |
| 2011/0043602 | A1 | 2/2011 | Lee |

* cited by examiner

*Primary Examiner* — Md S Elahee

(57) ABSTRACT

A method, non-transitory computer readable medium and apparatus for providing a communications service in a communications network are disclosed. For example, the method monitors a conference call, detects a triggering event during the conference call registered for a particular user, wherein the particular user is not a participant in the conference call, and notifies the particular user of the triggering event.

20 Claims, 3 Drawing Sheets

METHOD AND APPARATUS FOR PROVIDING AMBIENT SOCIAL TELEPHONY

This application is a continuation of U.S. patent application Ser. No. 13/286,329, filed Nov. 1, 2011, now U.S. Pat. No. 9,025,752, which is herein incorporated by reference in its entirety.

The present disclosure relates generally to a new form of telephony and, more particularly, to a method and apparatus for providing ambient social telephony.

BACKGROUND

Social media is a growing field. Social media allows users to share experiences with friends and other users. However, most of the social media is associated with websites. For example, many websites cater to the social media phenomenon, such as for example, Facebook®, Twitter®, LinkedIn® and the like. Currently, there are no social media platforms for telephony.

SUMMARY

In one embodiment, the present disclosure provides a method for providing a communications service in a communications network. For example, the method monitors a conference call, detects a triggering event during the conference call registered for a particular user, wherein the particular user is not a participant in the conference call, and notifies the particular user of the triggering event.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and apparatus for providing ambient social telephony in a communications network. Social media is becoming a popular technology for users. Typically, Internet websites provide outlets for hosting social media websites. Social media allows users to share experiences with friends and other users.

However, there are no social media platforms for telephony. The closest approach to a social media telephony experience currently is a conference call. However, present conference call technology suffers from a number of deficiencies, such as limited duration, no spontaneous sharing of the conference and no permanent record of the conferencing event.

One embodiment of the present disclosure provides a telephony platform for providing a social media outlet via ambient social telephony over any type of communications network including, for example, an internet protocol (IP) communications network, a cellular telephone network, a traditional circuit switched network, and the like. For example, when a topic of interest is detected in a conference call, a user may be notified by sending a short message service (SMS) message, an email, a text message, an automated telephone call, and the like, to their user endpoint device. As a result, users may use telephony as one platform for enjoying the benefits of social media.

Figure 1:
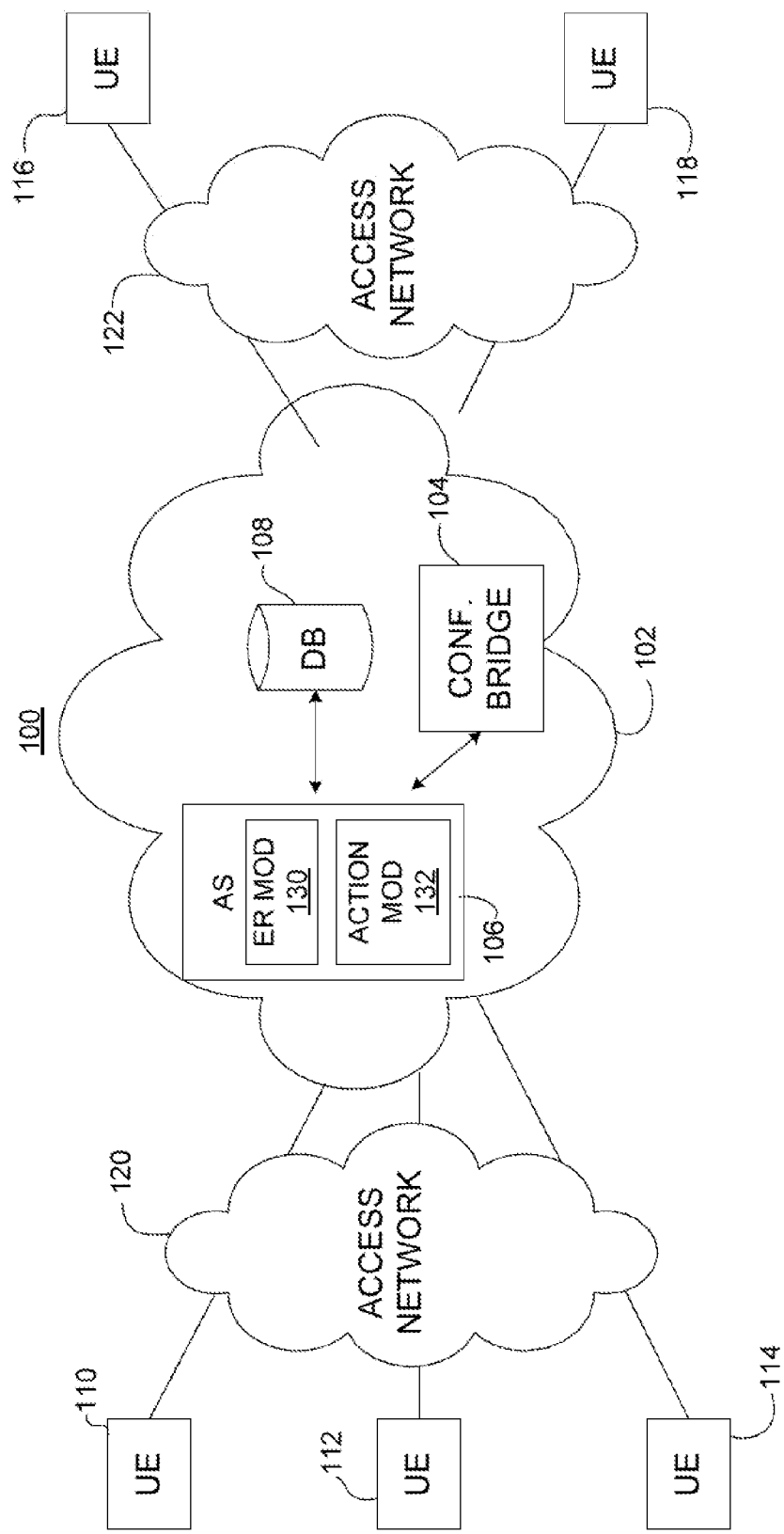
FIG. 1 illustrates one example of a communications network of the present disclosure.

FIG. 1 is a block diagram depicting one example of a communications network 100. The communications network 100 may be any type of communications network, such as for example, a traditional circuit switched network (e.g., a public switched telephone network (PSTN)) or an IP network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network or some access networks may be the same type of access network and other may be different types of access networks. The core network 102 and the access networks 120 and 122 may be operated by different service providers, the same service provider or a combination thereof.

In one embodiment, the access network 120 may be in communication with one or more user endpoints (also referred to as "endpoints") 110, 112 and 114. In one embodiment, the access network 122 may be in communication with one or more endpoints 116 and 118. The endpoints 110, 112, 114, 116 and 118 may be any type of endpoint devices capable of telephone communications and/or video conferencing including, for example, a PSTN telephone, a smart phone, a cellular telephone, a laptop, a tablet device, a desktop computer, and the like. In one embodiment, the endpoint devices 110, 112, 114, 116 and 118 may employ user agents that use session initiation protocol (SIP).

In one embodiment, the network 100 may include a conference bridge 104, an application server (AS) 106 and a database 108. Although only a single conference bridge 104, a single application server 106 and a single database 108 are illustrated, it should be noted that any number of conference bridges 104, application servers 106 or databases 108 may be deployed. It should be noted that the network 100 as shown in FIG. 1 has been simplified. For example, the core network 102 may comprise numerous other network elements that are not shown, e.g., border elements, routers, switches, gateways, firewalls, application servers, databases, call control elements, policy servers, security devices, content distribution servers, and the like. The operations and functions of these network elements are well known.

In one embodiment, the application server 106 may be in communication with the database 108 and the conference bridge 104. In one embodiment, the conference bridge 104 may be in communication with one or more of the endpoint devices 110, 112, 114, 116 and 118.

In one embodiment, FIG. 1 illustrates the conference bridge 104, the application server 106 and the database 108 being within the core network 102. However, it should be noted that the conference bridge 104, the application server 106 and the database 108 may also be located in any one of the access networks 120 and 122.

In one embodiment, the conference bridge 104 may host a conference call between two or more of the endpoints 110, 112, 114, 116 and 118. The conference bridge 104 may use any type of conference bridge and use authentication methods currently employed, such as for example, providing an assigned conference bridge telephone number, access codes and the like.

In one embodiment, the application server 106 may be in communication with the conference bridge 104 to monitor one or more conference calls. In one embodiment, the application server 106 may employ an event recognizer module 130 and an action module 132. The event recognizer module 130 and the action module 132 may be deployed on a single application server 106 or on different application servers 106.

In one embodiment, the event recognizer module 130 may use voice recognition and gesture recognition technology to monitor for triggering events that are pre-registered by users. In one embodiment, the user may pre-register one or more triggering events. For example, multiple triggering events may be registered by the user and the event recognizer module 130 may be capable of recognizing multiple triggering events simultaneously. Although examples are provided below using only a single triggering event for ease of illustration, it should not be read as limiting.

Any known voice recognition or gesture recognition technology may be used. The triggering events are discussed in further detail below. The event recognizer module 130 may use any existing voice recognition and gesture recognition technologies available today, e.g., natural language voice recognizers as deployed in automatic speech recognition (ASR) systems. In one embodiment, the event recognizer module 130 may monitor the conference call (broadly to include a telephone conference call and/or a video conference call) to determine if a triggering event has occurred.

In one embodiment, the application server 106 may monitor data sent to the conference bridge via sensors on one or more of the endpoints 110, 112, 114, 116 and 118. For example, the endpoints 110, 112, 114, 116 and 118 may include sensors such as a compass, a location sensor (e.g., global positioning system (GPS) receivers), a temperature sensor, an accelerometer, a video camera, and the like. The application server 106 may use the collected data from the sensors to determine if a triggering event has occurred.

In one embodiment, the action module 132 may be a combination of processes. For example, the action module 132 may include processes for automatic sensor recognition (ASR), sensor compilation, event notification and the like.

In one embodiment, the action module 132 may take one or more actions if the event recognizer module 130 determines that a triggering event has been detected. For example, a user may wish to be notified and provided an option to join the conference call or to receive a recorded portion of the conference call if a pre-registered triggering event is detected. As a result, the action module 132 may send out a notification to a user that the triggering event has been detected.

Notably, the user who is notified is not a party or a participant in the ongoing conference call or may be a participant in a different ongoing conference call. Said another way, the user is not even aware of the existence of the conference call. For example, the user may be driving in a car at a remote location while a conference call is ongoing or be participating in another different conference call. As a result, when the triggering event is detected, the user may be notified on the user's mobile endpoint device (e.g., a cellular phone, a smart phone, a tablet and the like) that a triggering event of interest to the user was detected on a conference call. The notification allows the user to be aware of the existence of the conference call and the fact that the conference call may be related to a topic that may be of interest to the user.

In one embodiment, the notification may be sent via a SIP notification message, a SMS message, a text message, an email message, an automated telephone call, and the like. In one embodiment, the notification may include an option to connect the user to the live ongoing conference call.

In another embodiment, the notification may include an option to connect the user to a recorded portion of the conference call containing the triggering event. For example, the user may listen to the recorded portion of the conference call even after the live conference call has ended. Thus, embodiments of the present disclosure may also provide a way to time shift telephone conversations or conference calls.

In one embodiment, the action module 132 may also annotate each section of the conference call that includes the triggering event. For example, as discussed in further detail below, the conference call may be recorded and stored in the database 108. Thus, portions of the recording may be annotated to include markers (e.g., time stamps or tags and the like) each time a triggering event is detected by the event recognizer module 130. In one embodiment, the markers may comprise a bracket of time before and after the triggering event (e.g., a predefined duration of the recorded portion of the conference call). As a result, if the user desires to connect to the recording of the conference call, the user may be provided a portion of the recording before and after the triggering event. This will allow the user to have information to gauge the context surrounding the triggering event.

In other words, this helps to provide context to the user in case the triggering event was a false positive. For example, the user may have pre-registered a key word "apple pie" as a topic of interest. Thus, the user only wants to be notified when callers are discussing "apple pie" because the user likes "apple pie." However, the callers on the conference call may actually dislike "apple pie" and may be speaking negatively about it. However, the event recognizer module 130 would detect the key word "apple pie" as a triggering event and instruct the action module 132 to send a notification to the user. The user may then select to connect to the recording of the conference call. The user could listen to the recorded conference call and determine that "apple pie" is actually being discussed negatively within the context of the conference call and decide not to join the live ongoing conference call. In one embodiment, after the user has listened to the recording of the conference call, the user may be presented with the option to join the live ongoing conference call again.

In one embodiment, the database 108 may store information related to one or more users associated with the endpoint. For example, in one embodiment, each user of an endpoint device may elect to subscribe to the ambient social telephony services. The user may then register triggering events that are stored in the database 108. It should be noted that in one embodiment, the registration of the triggering events can simply be correlated to the "interests" of the user, e.g., similar to interest information disclosed by a user in various social media websites. In other words, a user may simply provide various topics or issues of interests or affiliations (e.g., schools attended by the user, clubs in which the user is a member, and so on). In turn, the communications network may automatically generate a listing of triggering events associated with the user. The communications network may then presents this listing to the user to see whether the user wants to make any adjustments to the listing for the purpose of supporting the present ambient social telephony service. Furthermore, the user may simply provide information to the communications network as to a particular link of a social media website in which the user's interests have already been listed, thereby saving the user from having to reenter all the information again.

In one embodiment, the triggering events may include key words, key gestures or key data. For example, key words may include words of interest to the user such as their name, a favorite sports team, a favorite food, politicians of interest, and the like. The user may register any words that are of interest to them that may be detected during a conference call between other users.

In one embodiment, each of the triggering events may also be associated with predefined threshold and/or a predefined time period. For example, a user may want to be notified only if the key word "apple pie" is used three times within a five minute time period. This may help ensure that the triggering event is a significant portion of the conversation and not just mentioned in passing or a tangent to the overall conversation.

In another example, the user may want to be notified if the key data of temperature is under 20 degrees Celsius or under 20 degrees Celsius on a particular day of the week and/or at a particular time in the day. Thus, the triggering events may have some calculus associated with each event to provide more granularity for the user to control when to be notified.

In one embodiment, key gestures may include various gestures or movements of interest to the user. For example, the user may be interested when a caller during a video conference frowns, when a caller is walking while talking, when certain hand signals are used (e.g., thumbs up, thumbs down, crossing various fingers, raising or pumping fists, shaking heads up and down, side to side, and the like), and the like.

In one embodiment, the key data (broadly including key words or key gestures) may include various data taken or derived from documents such as spreadsheets, slide shows, or video files. For example, the user may be interested in financial data about the user's company, a particular scientific topic and the like. Thus, a slide show pertaining to the user's company or a scientific topic can be submitted as key data, and the key gestures and key words can be extracted from the slide shows.

In another embodiment, the key data may include data related to information collected from a sensor on one of the endpoints 110, 112, 114, 116 or 118, as discussed above. For example, the user may be interested in various events when endpoint 110 is in a particular geographic location, when the endpoint 110 detects a particular temperature, when the endpoint 110 is moving in a particular direction and the like. For example, when the endpoint is geographically near a stadium, the user may be interested in a sports discussion occurring in a conference call pertaining to a sports event being held at the stadium. In other words, the triggering event may require the matching of data that is received from an endpoint of the particular user. For example, the triggering event may comprise a key term of "team A" and when the user is within 5 miles of the stadium that "team A" plays in. Thus, a conference call where the discussion revolves around "team A" is not sufficient to trigger a notification to the user. However, once the user is physically within 5 miles of the stadium, then the triggering event is detected.

In another example, the triggering event may comprise a key term of "power outage" and the condition that the user is in an environment that is 100 degree Fahrenheit. For example, when the endpoint detects a certain temperature, the user may be interested in a discussion occurring in a conference call pertaining to possible power outages or brown outs. Thus, such data pertaining to the various triggering events will be sent automatically by the endpoint devices to the communications network.

In yet another example, the user may be travelling at a foreign country and is currently near a particular location. The user may be interested in conference calls where discussions revolve around that particular location, e.g., the user is within 5 miles of a particular tourist attraction and the key word is "good restaurant". Not being familiar with the area, the user can be joined to a conference call (or hear a portion of a recorded conference call) where participants are currently discussing good restaurants near the tourist attraction and so on. This example can be extended to current entertainment events (e.g., sports events, concerts, theatrical shows, and so on) or security issues (e.g., storm warnings, security threats, and so on) associated with the particular location. This will quickly provide great insights to the user for the particular area of a foreign country that the user is not familiar with.

Figure 2:
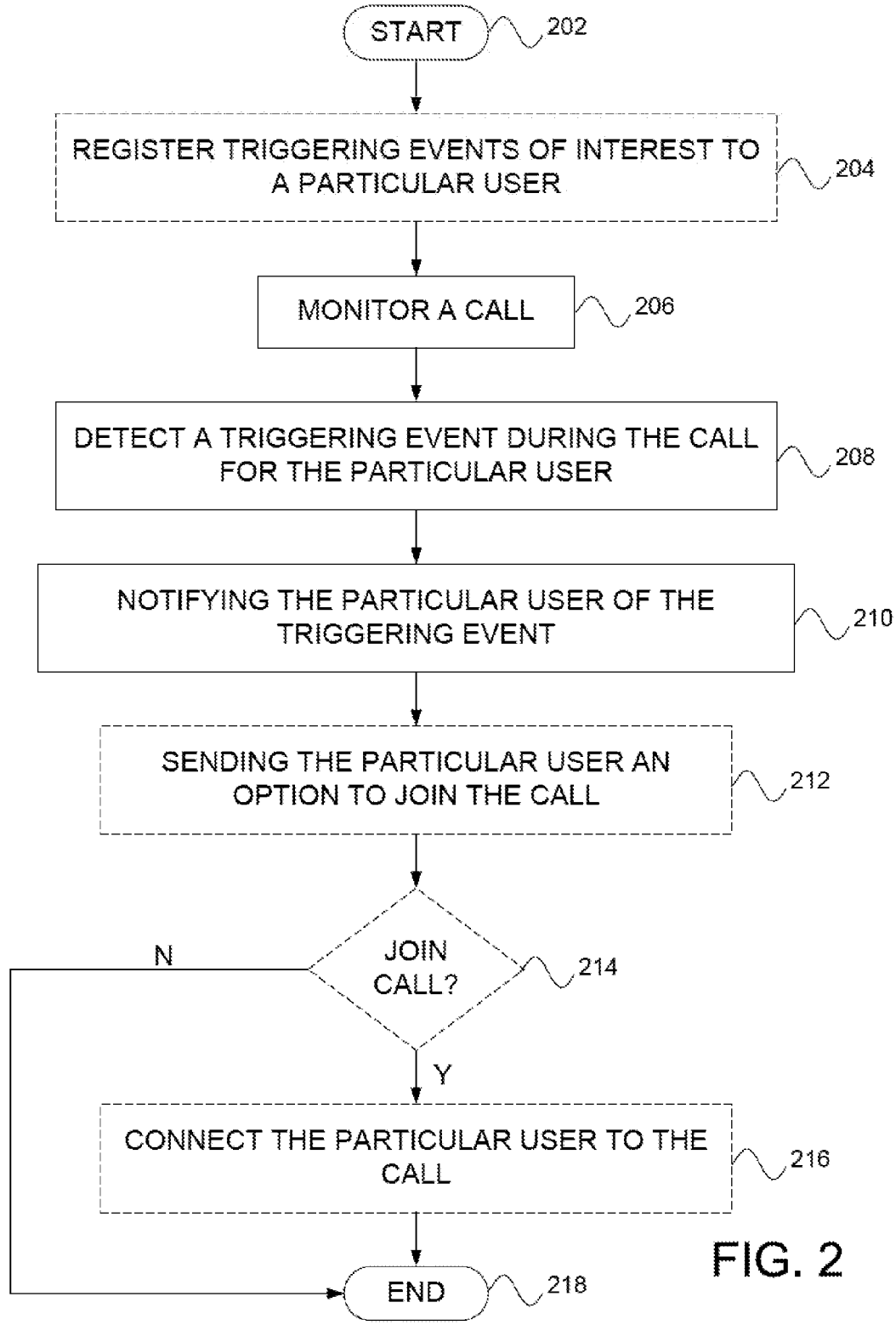
FIG. 2 illustrates an example flowchart of one embodiment of a method for providing ambient social telephony in a communications network.
Figure 3:
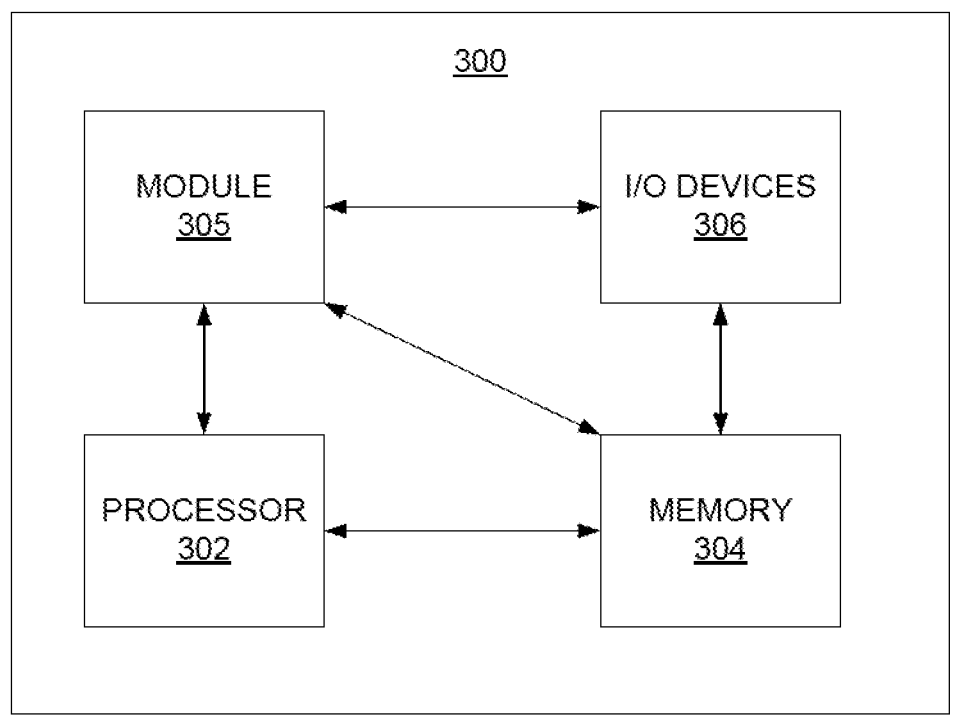
FIG. 3 illustrates a high-level block diagram of a general-purpose computer suitable for use in performing the functions described herein.

FIG. 2 illustrates a flowchart of a method 200 for providing ambient social telephony in a communications network. In one embodiment, the method 200 may be performed by the application server 106 or a general purpose computer as illustrated in FIG. 3 and discussed below.

The method 200 beings at step 202. At optional step 204, the method 200 registers triggering events of interest to a particular user. For example, users may elect to subscribe to the ambient social telephony service so that they can be notified when an ongoing conference call includes topics or events of interest to them. Once the users are subscribed, each user may register triggering events that are interest. Thus, a database may store and register triggering events that are of interest to a particular user among all the registered users. As discussed above, triggering events may include key words, key gestures or key data.

At step 206, the method 200 monitors a conference call. In one embodiment, the call may be an audio only conference call. In another embodiment, the call may be a video conference call (e.g., having audio and video). For example, two users other than the particular user may initiate a conference call in the communications network 100 via the conference bridge 104. In other words, the particular user may not be a party in the conference call while the conference call is being monitored. Furthermore, in one embodiment, the conference call is being monitored with the permission of the participants of the conference call. For example, the participants on the conference call can be the co-workers of the particular user, the participants on the conference call can be the friends or family members of the particular user, or the participants on the conference call can be club members of a club that the particular user is a member of, and so on. Alternatively, in one embodiment, the conference call may be a public conference call, e.g., a public town hall conference call where anyone is allowed to participate in the conference call, e.g., to discuss issues relating to a town.

In one embodiment, the monitoring may be performed by an event recognizer module 130. For example, the event recognizer module 130 tries to detect triggering events that occur during the conference call.

At step 208, the method 200 detects a triggering event during the conference call for the particular user. In one embodiment, the triggering event may be detected by the event recognizer module 130.

As discussed above, the triggering events are pre-registered by users that elect to subscribe to the ambient social telephony service. In one embodiment, the triggering events may include key words, key gestures or key data. For example, key words may include words of interest to the user such as their name, a favorite sports team, a favorite food, politicians of interest and the like. The user may register any words that are of interest to the user that may be detected during a conference call between other users.

In one embodiment, key gestures may include various gestures or movements of interest to the user. For example, the user may be interested when a caller during a video conference frowns, when a caller is walking while talking, when certain hand signals are used and the like.

In one embodiment, the key data may include various data extracted from documents such as spreadsheets or slide shows. In another embodiment, the key data may include data related to information collected from a sensor on one of the endpoints 110, 112, 114, 116 or 118, as discussed above. For example, the user may be interested in when endpoint 110 is in a particular geographic location, when the endpoint 110 detects a particular temperature, when the endpoint 110 is moving in a particular direction and the like.

At step 210, the method 200 notifies the particular user of the occurrence of the triggering event. Notably, the user who is notified is not a participant in the ongoing conference call. In other words, the particular user may not even be aware that the call is ongoing. For example, the user may be driving a vehicle at a remote location while a conference call is ongoing. As a result, when the triggering event is detected, the user may be notified on user's mobile telephone that a triggering event of interest to the user has been detected on a call. In one embodiment, the notification may be sent by an action module 132. In one embodiment, the notification may be sent via a SIP-based notification message, a short message service (SMS) message, a text message, an email message, a telephone call and the like.

At optional step 212, the method 200 sends the particular user an option to join the conference call. In one embodiment, the notification may include an option to connect the user to the conference call or an option to connect the user to a recorded portion of the conference call containing the triggering event. For example, the option to join may simply include an inquiry as to whether the user wants to press a particular key on the user's endpoint (or a link can be displayed on a screen of the user's endpoint) so that a session can be established to the user's endpoint to join the user to the conference call. Alternatively, the option to join the conference call may simply present the conference bridge information, e.g., a phone number and an access code, to the user endpoint.

At optional step 214, the method 200 determines whether the particular user wants to join the conference call. If the method 200 determines that the user does not want to join the conference call, the method 200 proceeds to step 218 where the method 200 ends. However, if the method 200 determines that the user does want to join the conference call, the method 200 proceeds to optional step 216.

At optional step 216, the method 200 connects the particular user to the conference call. For example, if the user selected an option to connect to a live portion of the conference call, the user may be connected to the conference bridge 104 associated with the desired conference call. In another example, if the user selected an option to connect to a recorded portion of the conference call, the user may be connected to the application server 106 to listen to the recorded portion of the conference call obtained from the database 108. Alternatively, the application server 106 may forward an audio file having the pertinent section of the conference call to the user's endpoint. The method 200 ends at step 218.

It should be noted that although not explicitly specified, one or more steps of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises a hardware processor element 302 (e.g., a CPU), a memory 304, e.g., random access memory (RAM) and/or read only memory (ROM), a module 305 providing ambient social telephony in a communications network, and various input/output devices 306 (e.g., sensor devices (such as a thermometer, motion sensor, video camera, voice recorder, and the like) storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed method. In one embodiment, the present module or process 305 for providing ambient social telephony in a communications network can be loaded into memory 304 and executed by processor 302 to implement the functions as discussed above. As such, the present method 305 for providing ambient social telephony in a communications network as discussed above in method 200 (including associated data structures) of the present disclosure can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for notifying a particular user, the method comprising:
monitoring, by a processor, an ongoing conference call;
detecting, by the processor, a triggering event during the ongoing conference call registered for the particular user, wherein the particular user is not a participant in the ongoing conference call, wherein the ongoing conference call is not scheduled for the particular user, wherein the triggering event comprises a key word of interest to the particular user that is pre-registered by the particular user and detected during the ongoing conference call between other users on the ongoing conference call; and
notifying, by the processor, the particular user to receive a recorded portion of the ongoing conference call in response to detecting the pre-registered triggering event.

2. The method of claim 1, further comprising:
connecting the particular user to the ongoing conference call upon receiving a confirmation that the particular user wants to join the ongoing conference call.

3. The method of claim 1, further comprising:
receiving a registration of the triggering event of interest from the particular user before monitoring the ongoing conference call.

4. The method of claim 1, wherein the detecting is performed via an automated voice recognition module.

5. The method of claim 1, wherein the detecting is performed via a gesture detection module.

6. The method of claim 1, wherein the notifying comprises sending a short message service message to the particular user.

7. The method of claim 1, wherein the ongoing conference call comprises a video conference call.

8. The method of claim 1, wherein the triggering event further comprises a key gesture.

9. The method of claim 1, wherein the triggering event further comprises a key data.

10. The method of claim 1, wherein the triggering event further comprises key data that matches data that is received from an endpoint of the particular user.

11. A non-transitory computer-readable medium storing a plurality of instructions which, when executed by a processor, cause the processor to perform operations for notifying a particular user, the operations comprising:
monitoring an ongoing conference call;
detecting a triggering event during the ongoing conference call registered for the particular user, wherein the particular user is not a participant in the ongoing conference call, wherein the ongoing conference call is not scheduled for the particular user, wherein the triggering event comprises a key word of interest to the particular user that is pre-registered by the particular user and detected during the ongoing conference call between other users on the ongoing conference call; and
notifying the particular user to receive a recorded portion of the ongoing conference call in response to detecting the pre-registered triggering event.

12. The non-transitory computer-readable medium of claim 11, further comprising:
connecting the particular user to the ongoing conference call upon receiving a confirmation that the particular user wants to join the ongoing conference call.

13. The non-transitory computer-readable medium of claim 11, further comprising:
receiving a registration of the triggering event of interest from the particular user before monitoring the ongoing conference call.

14. The non-transitory computer-readable medium of claim 11, wherein the notifying comprises sending a short message service message to the particular user.

15. The non-transitory computer-readable medium of claim 11, wherein the ongoing conference call comprises a video conference call.

16. The non-transitory computer-readable medium of claim 11, wherein the triggering event further comprises key data that matches data that is received from an endpoint of the particular user.

17. An apparatus for notifying a particular user, the apparatus comprising:
a processor; and
a non-transitory computer readable medium storing a plurality of instructions, which when executed by the processor perform operations, the operations comprising:
monitoring an ongoing conference call;
detecting a triggering event during the ongoing conference call registered for the particular user, wherein the particular user is not a participant in the ongoing conference call, wherein the ongoing conference call is not scheduled for the particular user, wherein the triggering event comprises a key word of interest to the particular user that is pre-registered by the particular user and detected during the ongoing conference call between other users on the ongoing conference call; and
notifying the particular user to receive a recorded portion of the ongoing conference call in response to detecting the pre-registered triggering event.

18. The apparatus of claim 17, the operations further comprising:
connecting the particular user to the ongoing conference call upon receiving a confirmation that the particular user wants to join the ongoing conference call.

19. The apparatus of claim 17, the operations further comprising:
receiving a registration of the triggering event of interest from the particular user before monitoring the ongoing conference call.

20. The apparatus of claim 17, wherein the notifying comprises sending a short message service message to the particular user.

* * * * *